W. C. KING.
COLLAPSIBLE RIM.
APPLICATION FILED SEPT. 12, 1917.
1,304,488.
Patented May 20, 1919.
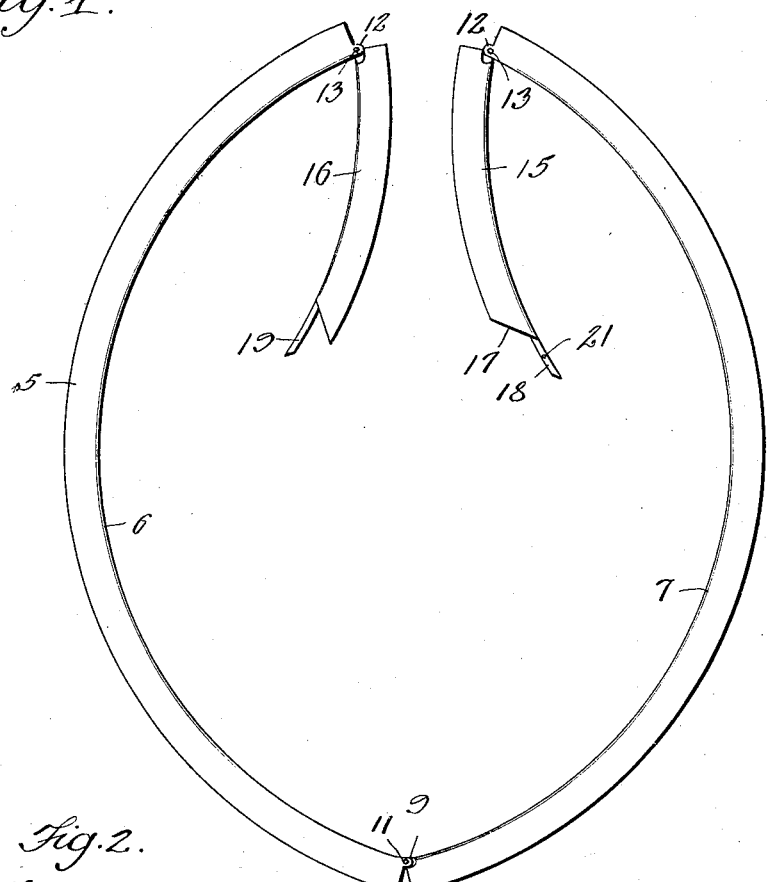
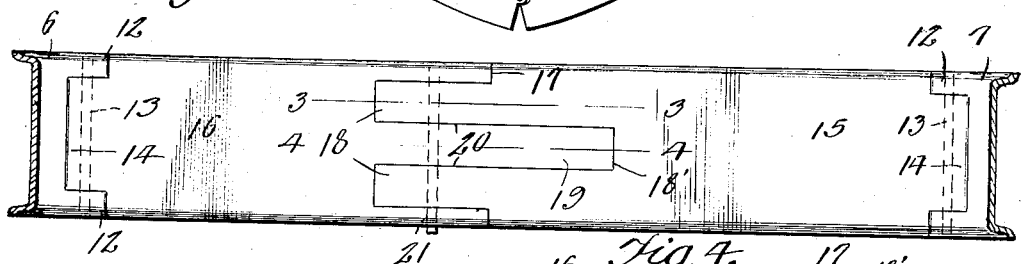
Inventor
W. C. King,
By Victor J. Evans
Attorney
Witness

__UNITED STATES PATENT OFFICE.__

WILLIS C. KING, OF BEAUMONT, TEXAS.

COLLAPSIBLE RIM.

1,304,488.     Specification of Letters Patent.     Patented May 20, 1919.

Application filed September 12, 1917. Serial No. 191,066.

*To all whom it may concern:*

Be it known that I, WILLIS C. KING, a citizen of the United States, residing at Beaumont, in the county of Jefferson and State of Texas, have invented new and useful Improvements in Collapsible Rims, of which the following is a specification.

This invention relates to demountable rims of that type which may be collapsed to facilitate the removal of the tire therefrom in an easy and expeditious manner.

The chief characteristic of the present invention contemplates the provision of a rim of the above stated character wherein the sections constituting the main rim section of the rim are each provided with a hinged locking extremity for securing the rim in a spread or circular condition, and wherein each of the locking members will be subjected to an equal strain to impart thereto a lengthwise movement upon the extension of the rim to its circular form.

In carrying out these features, use is made of a locking link pivotally connected to the confronting ends of said sections and the confronting ends of each of the locking links are provided with a tongue and groove connection, whereby the meeting edges of the links may be brought into abutting contact with one another previous to the spreading action of the sections, consequently, the links when subjected to pressure will simultaneously operate the links in a lengthwise direction and accomplish a durable and efficient structure for the extension of the rim to tire engaging position.

Furthermore, I aim in providing means for removably connecting and locking the meeting or adjacent ends of the links to guard or prevent against an inward movement of the same.

With the above and other objects in view, the invention consists in the novel features, details of construction and combination of parts which will hereinafter be more fully set forth, illustrated in the accompanying drawing and pointed out in the appended claim.

In the drawing:

Figure 1 is a side view of the rim in its collapsed position;

Fig. 2 is an enlarged detail plan view illustrating the locking position of the links; and Fig. 3 is a detail longitudinal sectional view.

Fig. 4 is a section taken on line 4—4 of Fig. 2, and

Fig. 5 is a detail plan view of the hinge connection of the section.

Referring more particularly to the accompanying drawing, 5 denotes a collapsible rim preferably constructed of a pair of sections 6 and 7 respectively. One extremity of the section 6 is channeled out to provide spaced ears 8 and 9, while one extremity of the section 7 is formed with a lug 10 adapted to fit between the ears 8 and 9 of the rim section 6 and passing through this lug and later referred to ears is a pin 11 serving as the axis for said sections, and pivotally connecting the sections together for movement in an outward and inward direction. The opposite ends of the sections 6 and 7 are likewise provided with a pair of spaced ears 12, and a pin 13 passes through the ears 12 of the respective sections 6 and 7 and through a lug 14 terminally provided on the inner end of each of the toggle links 15 and 16 connecting the links to the confronting ends of the respective sections for vertical swinging movement. The confronting or meeting extremities of each of the toggle links are beveled. The end 17 of the link 15 has projecting longitudinally therefrom a pair of offset longitudinally spaced fingers 18, defining therebetween a groove 18' which extends inwardly of the beveled ends 17 and opens out through the inner surface of the link 15, while the adjacent end or confronting extremity of the toggle link 16 is formed with a centrally located tongue 19 spacing from one another the longitudinally arranged grooves 20 therefor, and upon the interlocking of the meeting ends of the toggle links with one another, the tongue of the link section 16 will engage between the fingers 18 and within the groove 18', while the spaced fingers of the opposite link section will be seated in the spaced grooves 20, consequently, presenting a smooth peripheral surface at the point of contact of the link sections with one another. However, in order to prevent any buckling of the rim a locking pin is employed and insertible through the registering openings 21 of the fingers, the opening of the tongue 19 and the openings formed in the opposite side walls of the link section 16.

In briefly describing the operation of the invention, and assuming the user is desirous of removing the tire from the channel B of the demountable rim, the locking pin or bolt 11 is first extracted and a blow dealt to the tire right above the point of interlocking of the toggle link sections with one another, which in turn will force such link sections in an inward direction, whereby upon further blows being dealt to the tire, the rim sections will swing on their pivots to assume a substantially elliptical form, all of which being clearly shown in Fig. 1 of the drawing. After the tire has been repaired and the spreading action of the demountable rim is desired, the tire is first mounted upon the rim sections, to completely embrace their point of connection with one another. The tongue is placed between the spaced fingers and the beveled confronting edges of each of the toggle link sections are engaged with one another; consequently, the complete spreading action of the demountable rim will cause a simultaneous lengthwise adjustment or movement of the toggle link sections and each link section is subjected to equal pressure by the placing of the foot of the user on the toggle link sections. The locking bolt is thence passed through suitable openings of the toggle link section 16, fingers and tongue, and a firm connection of the demountable rim is established.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claim.

What is claimed as new is:—

A collapsible rim comprising a pair of pivotally connected sections, a toggle link pivotally connected to the confronting extremity of each section, a pair of spaced apertured fingers formed on the meeting end of one of said toggle links defining therebetween a groove, a tongue formed on the adjacent end of the opposite link section and presenting a pair of grooves, the fingers of the first mentioned toggle link engaging in the grooves of the second mentioned link section when both of the link sections are in a spread or open position, and a locking bolt detachably insertible in the apertures of the fingers and tongue of both sections for locking the toggle link sections against inward movement.

In testimony whereof I affix my signature.

WILLIS C. KING.